(12) United States Patent
Mao et al.

(10) Patent No.: US 10,153,679 B2
(45) Date of Patent: Dec. 11, 2018

(54) LINEAR VIBRATION MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 252 days.

(21) Appl. No.: 15/228,222

(22) Filed: Aug. 4, 2016

(65) Prior Publication Data

US 2017/0110934 A1 Apr. 20, 2017

(30) Foreign Application Priority Data

Oct. 16, 2015 (CN) .................... 2015 2 0806057 U

(51) Int. Cl.
*H02K 33/00* (2006.01)
*H02K 7/12* (2006.01)
*H02K 5/04* (2006.01)
*H02K 33/02* (2006.01)
*H02K 33/16* (2006.01)

(52) U.S. Cl.
CPC ................ *H02K 7/12* (2013.01); *H02K 5/04* (2013.01); *H02K 33/00* (2013.01); *H02K 33/02* (2013.01); *H02K 33/16* (2013.01)

(58) Field of Classification Search
CPC .......... H02K 7/12; H02K 33/00; H02K 33/16; H02K 5/04; F16F 15/02; F16F 15/04; F16F 15/06; F16F 15/063; F16F 15/073; F16F 15/08; F16F 15/085
USPC ........................................ 267/140.5
See application file for complete search history.

(56) References Cited

U.S. PATENT DOCUMENTS

| 8,334,624 | B2* | 12/2012 | Dong ..................... | H02K 33/16 310/13 |
| 2013/0076178 | A1* | 3/2013 | Kuroda .................. | H02K 33/00 310/81 |
| 2013/0313919 | A1* | 11/2013 | Nakamura ............. | H02K 33/00 310/25 |
| 2014/0054983 | A1* | 2/2014 | Moon .................... | H02K 33/16 310/28 |

\* cited by examiner

*Primary Examiner* — Burton Mullins
(74) *Attorney, Agent, or Firm* — Na Xu; IPro, PLLC

(57) ABSTRACT

A linear vibration motor includes a base with an accommodation space, a vibration unit and two elastic parts fixed respectively on the opposite ends of the vibration unit. The elastic parts include a main elastic part and an auxiliary elastic part. The auxiliary elastic part includes a first auxiliary elastic part and a second auxiliary elastic part which are fixed respectively on the opposite sides of the vibration unit and the base which are parallel to the vibration direction of the vibration unit. Compared with the related technology, the liner vibration motor of the present disclosure has a good performance and a high reliability.

5 Claims, 3 Drawing Sheets

LINEAR VIBRATION MOTOR

FIELD OF THE INVENTION

The present disclosure is related to vibration motors, specifically related to a linear vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A related liner vibration motor includes a base with an accommodation space, a vibration unit located in the accommodation space, and a U-shape elastic part fixed on the opposite sides of the vibration unit. The elastic part is used to fix the vibration unit on the base and suspend it within the accommodation space.

However, in the related liner vibration motor, the amplitude of the vibration unit supported by the elastic part in U shape is comparatively small, when its coefficient of elasticity on the vibration direction is comparatively small, its elastic system on the direction which is vertical to the vibration direction is also comparatively small for which it is prone to shaking when the vibration unit vibrates. The instability of vibration affects the performance and reliability of the liner vibration motor.

Therefore, an improved linear vibration motor which can overcome the problems mentioned above is accordingly desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiment described hereby is only to explain this disclosure, not intended to limit this disclosure.

Figure 1:
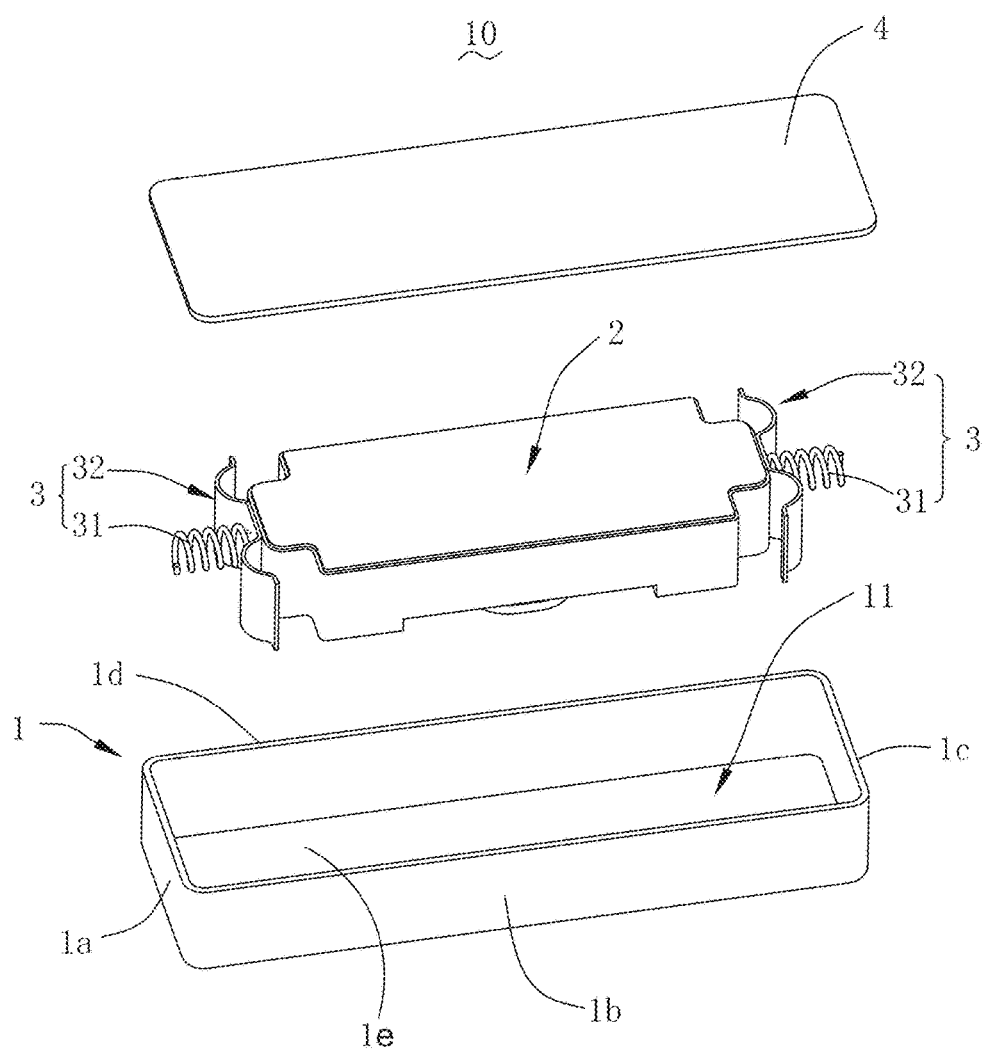
FIG. 1 is an isometric and exploded view of a linear vibration motor in accordance with an exemplary embodiment of the present disclosure.
Figure 2:
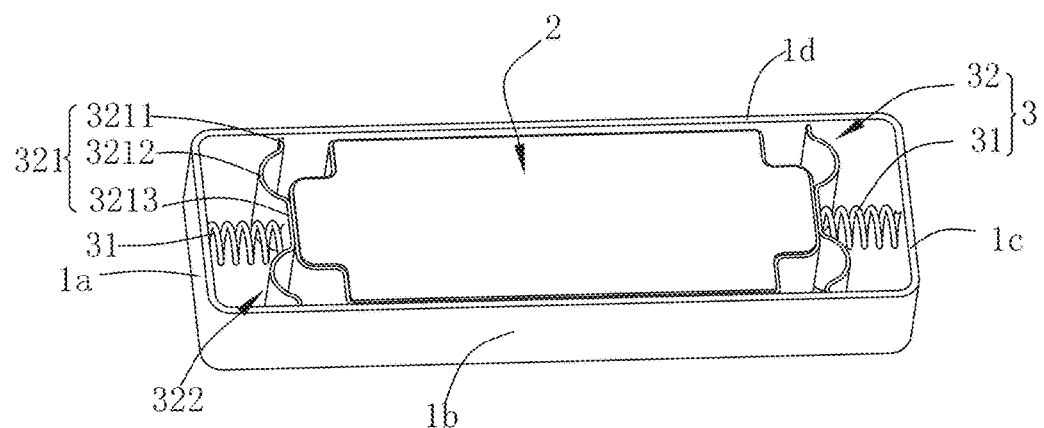
FIG. 2 is an assembled view of a vibration unit and elastic parts of the liner vibration motor in FIG. 1.

Referring to FIGS. 1-2, a liner vibration motor 10, in accordance with an exemplary embodiment of the present disclosure, includes a base 1, a vibration unit 2, two groups of elastic parts 3 and a cover plate 4. The base 1 coordinates with the cover plate 4 to form an accommodation space 11 that receives the vibration unit 2 and the elastic parts 3.

The base 1 is a hollow shell which includes a base plate 1e and four side walls 1a, 1b, 1c and 1d that are connected from head to tail, the side walls 1a, 1b, 1c and 1d are all set at the same side of the base plate 1e and also set for the connection with the base plate 1e. The base plate 1e coordinates with the side walls 1a, 1b, 1c and 1d to form the accommodation space 11 with an orifice 11. The cover of the cover plate 4 is set at the position of the orifice of the accommodation space 11 of the base 1, the cover plate 4 coordinates with the base 1 to form the accommodation space 11.

The vibration unit 2 is accommodated in the accommodation space 11 of the base 1.

The two groups of the elastic parts 3 are fixed respectively on the opposite sides of the vibration unit 2 and located between the vibration unit 2 and the side walls 1a and 1c. The two groups of the elastic parts 3 are symmetrically arranged with the regard to the vibration unit 2 and elastically support the vibration unit in the accommodation space 11. The elastic parts 3 include a main elastic part 31 and an auxiliary elastic part 32. One end of the main elastic part is fixed on the vibration unit 2, the other end is fixed on one of the side walls 1a, 1c of the base 1 which is vertical to a vibration direction of the vibration unit 2, the main elastic part 31 is used to provide the positive stiffness for the vibration unit 2 on its vibration direction, that is to provide the elastic restoring force pointing to the initial position which guarantees the vibration performance of the vibration unit 2 on its vibration direction. Specifically, the main elastic part 31 is helical spring.

The auxiliary elastic part 32 is made of flat elastic part, and includes a first auxiliary elastic part 321 and a second auxiliary elastic part 322. One end of the first auxiliary elastic part 321 is fixed on the vibration unit 2, and the other end is fixed on the base 1. One end of the second auxiliary elastic part 322 is fixed on the vibration unit 2, the other end is fixed on the sidewalls of the base 1 which is parallel to the vibration direction of the vibration unit 2. The structure of the first auxiliary elastic part 321 is the same with the structure of the second subsidiary part 322 and both are symmetrically arranged with the regard to the axis where the main elastic part 31 is located.

The vibration direction of the vibration unit 2 is defined as the direction of X axis, the direction of the plane which is vertical to the vibration direction of the vibration unit 2 is the direction of Y axis, the direction of the plane which is vertical to the vibration direction of the vibration unit 2 is the direction of Z axis. T The auxiliary elastic part 32 is used to provide support to the vibration unit 2 on the directions of Y and Z axis so that the movement of the vibration unit 2 can be more stable. It also provides negative stiffness for the vibration unit 2, the force provided is always on the back of the initial position of the vibration unit 2 for which the reciprocating movement cannot be created. The main elastic part 31 provides positive stiffness which is the force of restitution for the initial position of the vibration unit 2, the resultant force for both of the above stated is always pointing to the initial position of the vibration unit 2 which achieves the reciprocating vibration. It increases the amplitude of vibration for the above stated vibration unit 2 and improves the performance and reliability of the liner vibration motor 10.

Figure 3:
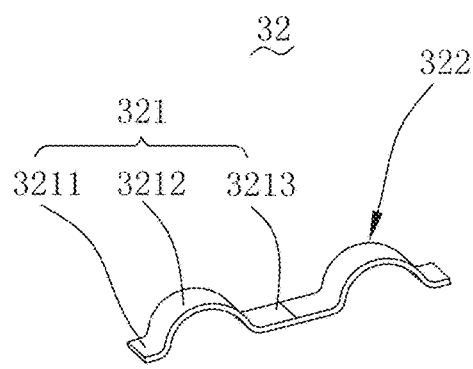
FIG. 3 is an isometric view of one elastic part of the linear vibration motor.

Referring to FIG. 3, the first auxiliary elastic part 321 includes a fixing part 3211, an elastic part 3212 extending from the fixing part 3211 and a connection part 3213 extending from the elastic part 3212. The fixing part 3211 abuts against the side wall 1*d* of the base 1. The connection part 3213 is fixed on the end of the vibration unit 2, it is also fixed on the main elastic part 31. The two ends of the elastic part 3212 connect respectively to the fixing part 3211 and one end of the connection part 3213 that are suspended on the accommodation space 11. The elastic part 3212 is an arc-shape structure protruding towards the vibration direction of the vibration unit 2. In this embodiment, the elastic part 3212 protrudes along the direction of the base 1 towards the vibration unit 2. Of course, the protruding direction of the elastic part 3212 may also be opposite to the above mentioned direction as long as the elastic parts 3212 of the two groups of the elastic parts 3 are symmetrically arranged with the regard to the vibration unit 2 to ensure that the resultant force sustained by the vibration unit 2 at the initial position is zero. The first auxiliary elastic part may elastically support the vibration spectra of the vibration unit 2, that is the vibration travel is decided by the arc length of the elastic part 3212, it may be extended as long as possible if space permits to increase the amplitude of the vibration unit and the performance of the liner vibration motor.

The structure of the second auxiliary elastic part 322 is the same with the structure of the first auxiliary elastic part 321 which will not be repeated hereby. What needs to be noticed is that the protruding directions of the elastic part 3212 for the first auxiliary elastic part 321 and the second auxiliary elastic part 322 being opposite must be guaranteed during the assembly, that is they are symmetrically arranged with the regard to the vibration unit 2 to ensure that the resultant force sustained by the vibration unit 2 at the initial position is zero.

In this embodiment, the first auxiliary elastic part 321 forms an integral structure with the second auxiliary elastic part 322, the main elastic part 31 is pressed and fixed on the connection part 3213, that is the main elastic part 31 is indirectly fixed and supported on the vibration unit 2.

Figure 4:
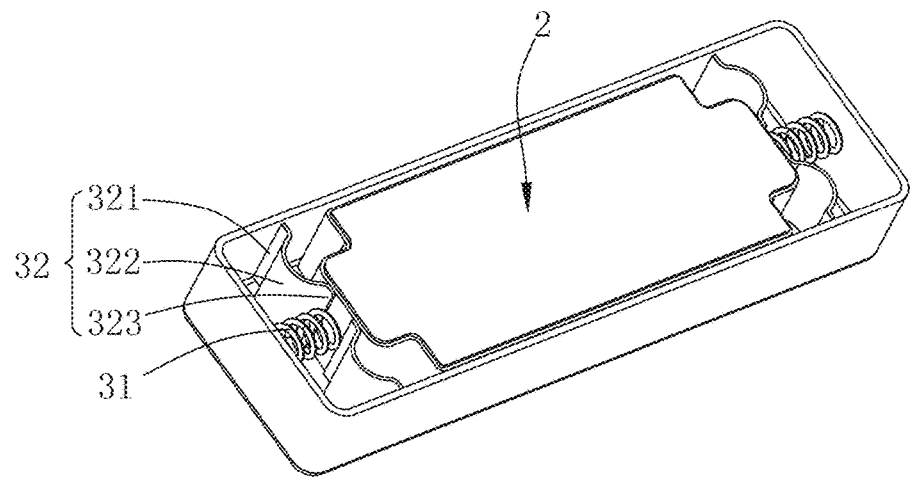
FIG. 4 is an assembled view of a vibration unit and elastic parts of a liner vibration motor in accordance with another exemplary embodiment of the present disclosure.
Figure 5:
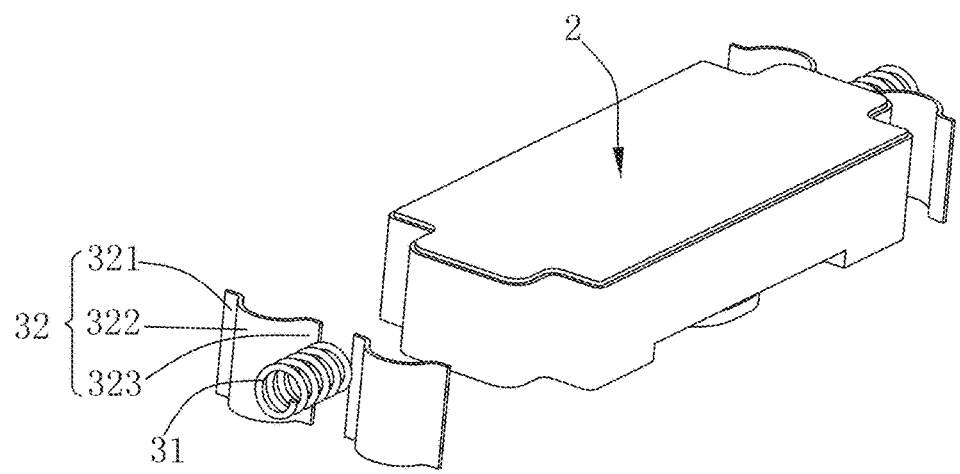
FIG. 5 is a partially exploded view of the linear vibration motor in FIG. 4.

Referring to FIGS. 4-5, a liner vibration motor of another embodiment of the liner vibration motor is basically the same with the above-mentioned embodiment, the difference is that: the auxiliary elastic part 32 is a split structure, that is the first auxiliary elastic part 321 forms a split structure with the second auxiliary elastic part 322 which is set with intervals that are fixed respectively on the vibration unit 2, the main elastic part 31 is located between the first auxiliary elastic part 321 and the second auxiliary elastic part 322 and is fixed on the vibration unit 2, that is the main elastic part 31 is directly fixed and supported on the vibration unit 2.

Compared with the related technology, the elastic parts of the liner vibration motor of the present disclosure use the main elastic parts mainly for the use of providing restoring force of vibration and the auxiliary elastic part mainly for the use of providing the balance force which is vertical to the vibration direction, the main elastic parts and the auxiliary elastic parts coordinate and complement with each other so that the amplitude of vibration can be larger for the vibration unit of the liner vibration motor with the balanced and stable performance being maintained on different directions which greatly improves the vibration performance and reliability of the liner vibration motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor, comprising:
a base with an accommodation space;
a vibration unit located in the accommodation space;
a plurality of groups of elastic parts located between the vibration unit and the base for elastically suspending the vibration unit, the elastic parts being symmetrically arranged with regard to the vibration unit, each group of the elastic parts including:
a main elastic part having one end fixed to the vibration unit, and another end fixed to a side of the base which is vertical to a vibration direction of the vibration unit;
an auxiliary elastic part including a first auxiliary elastic part and a second auxiliary elastic part, one end of the first auxiliary elastic part fixed on the vibration unit, the other end of the first auxiliary elastic part fixed on a side of the base which is parallel to the vibration direction; one end of the second auxiliary elastic part fixed on the vibration unit, and another end fixed on another side of the base which is parallel to the vibration direction of the vibration unit;
wherein
the structure of the first auxiliary elastic part is identical to the structure of the second auxiliary elastic part, and the first and second auxiliary elastic parts are symmetrically arranged with regard to an axis where the main elastic part is located;
the first auxiliary elastic part includes a fixing part, an elastic part extending from the fixing part, and a connection part extending from the elastic part, one end of the fixing part fixed on the base, one end of the connection part fixed on the vibration unit;
the elastic part extending from the fixing part is an arc-shape structure protruding along the vibration direction of the vibration unit.

2. The liner vibration motor as described in claim 1, wherein the elastic part extending from the fixing part protrudes along the vibration direction toward the base.

3. The liner vibration motor as described in claim 2, wherein the first auxiliary elastic part forms an integral structure with the second auxiliary elastic part, the main elastic part is pressed under the connection part.

4. The liner vibration motor as described in claim 2, wherein the first auxiliary elastic part forms a split structure with the second auxiliary elastic part which is set with intervals, the main elastic part is located between the first auxiliary elastic part and the second auxiliary elastic part.

5. The liner vibration motor as described in claim 1, wherein the main elastic part is a helical spring.

* * * * *